(12) United States Patent
Oh et al.

(10) Patent No.: US 7,226,702 B2
(45) Date of Patent: *Jun. 5, 2007

(54) SOLID POLYMER ELECTROLYTE AND METHOD OF PREPARATION

(75) Inventors: Bookeun Oh, Lisle, IL (US); Khalil Amine, Downers Grove, IL (US); Donald R. Vissers, Naperville, IL (US)

(73) Assignee: Quallion LLC, Sylmar, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 10/496,230

(22) PCT Filed: Jan. 22, 2003

(86) PCT No.: PCT/US03/02128

§ 371 (c)(1),
(2), (4) Date: May 20, 2004

(87) PCT Pub. No.: WO03/083971

PCT Pub. Date: Oct. 9, 2003

(65) Prior Publication Data

US 2005/0019667 A1    Jan. 27, 2005

(51) Int. Cl.
*H01M 6/18* (2006.01)

(52) U.S. Cl. .................. 429/304; 429/313; 429/317
(58) Field of Classification Search ............... 429/188, 429/189, 304, 313, 317
See application file for complete search history.

(56) References Cited

U.S. PATENT DOCUMENTS

| 3,172,899 A | 3/1965 | Bailey |
| 3,734,876 A | 5/1973 | Chu |
| 4,259,467 A | 3/1981 | Keogh et al. |

(Continued)

FOREIGN PATENT DOCUMENTS

| EP | 0 450 981 A1 | 10/1991 |
| EP | 0 525 728 A1 | 2/1993 |
| EP | 0 581 296 A2 | 2/1994 |
| EP | 0 581 296 A3 | 2/1994 |

(Continued)

OTHER PUBLICATIONS

M. Armand, New Electrode Material, Proceedings of the NATO Sponsored Advanced Study Institute on Fast Ion Transport in Solids, Solid State Batteries and Devices, 1972, Belgirate, Italy.

(Continued)

*Primary Examiner*—Tracy Dove
*Assistant Examiner*—Helen O. Chu
(74) *Attorney, Agent, or Firm*—Gavrilovich, Dodd & Lindsey LLP

(57) ABSTRACT

Disclosed is an improved solid electrolyte made of an interpenetrating network type solid polymer comprised of two compatible phases: a crosslinked polymer for mechanical strength and chemical stability, and an ionic conducting phase. The highly branched siloxane polymer of the present invention has one or more poly(ethylene oxide) ("PEO") groups as a side chain. The PEO group is directly grafted to silicon atoms in the siloxane polymer. This kind of branched type siloxane polymer is stably anchored in the network structure and provides continuous conducting paths in all directions throughout the IPN solid polymer electrolyte. Also disclosed is a method of making an electrochemical cell incorporating the electrolyte. A cell made accordingly has an extremely high cycle life and electrochemical stability.

50 Claims, 10 Drawing Sheets

U.S. PATENT DOCUMENTS

| | | | |
|---|---|---|---|
| 4,830,939 A | 5/1989 | Lee et al. | |
| 4,849,856 A | 7/1989 | Funari et al. | |
| 4,908,283 A | 3/1990 | Takahashi et al. | |
| 5,037,712 A | 8/1991 | Shackle et al. | |
| 5,112,512 A | 5/1992 | Nakamura | |
| 5,272,021 A | 12/1993 | Asai et al. | |
| 5,300,375 A | 4/1994 | Chaloner-Gill | |
| 5,362,493 A | 11/1994 | Skotheim et al. | |
| 5,419,984 A * | 5/1995 | Chaloner-Gill et al. | 429/313 |
| 5,475,127 A | 12/1995 | Klein et al. | |
| 5,538,812 A | 7/1996 | Lee et al. | |
| 5,593,787 A | 1/1997 | Dauth et al. | |
| 5,609,974 A | 3/1997 | Sun | |
| 5,633,098 A | 5/1997 | Narang et al. | |
| 5,690,702 A | 11/1997 | Skotheim et al. | |
| 5,700,300 A | 12/1997 | Jensen et al. | |
| 5,731,104 A | 3/1998 | Ventura et al. | |
| 5,753,389 A | 5/1998 | Gan et al. | |
| 5,772,934 A | 6/1998 | MacFadden | |
| 5,882,812 A | 3/1999 | Visco et al. | |
| 5,885,733 A * | 3/1999 | Ohsawa et al. | 429/309 |
| 5,919,587 A | 7/1999 | Mukherjee et al. | |
| 5,961,672 A | 10/1999 | Skotheim et al. | |
| 6,013,393 A | 1/2000 | Taniuchi et al. | |
| 6,015,638 A | 1/2000 | Ventura et al. | |
| 6,124,062 A | 9/2000 | Horie et al. | |
| 6,168,885 B1 | 1/2001 | Narang et al. | |
| 6,181,545 B1 | 1/2001 | Amatucci et al. | |
| 6,245,465 B1 | 6/2001 | Angell et al. | |
| 6,248,481 B1 | 6/2001 | Visco et al. | |
| 6,252,762 B1 | 6/2001 | Amatucci | |
| 6,268,088 B1 | 7/2001 | Oh et al. | |
| 6,337,383 B1 | 1/2002 | West et al. | |
| 6,447,952 B1 | 9/2002 | Spiegel et al. | |
| 6,482,912 B2 | 11/2002 | Boudjouk et al. | |
| 6,495,287 B1 | 12/2002 | Kolb et al. | |
| 6,573,009 B1 | 6/2003 | Noda et al. | |
| 6,610,109 B2 | 8/2003 | Noh | |
| 6,653,015 B2 | 11/2003 | Yoshida et al. | |
| 2002/0028388 A1 | 3/2002 | Lee | |
| 2002/0051911 A1 | 5/2002 | Okada | |
| 2002/0192554 A1 | 12/2002 | Woo et al. | |
| 2003/0036003 A1 | 2/2003 | Shchori et al. | |
| 2003/0099884 A1 | 5/2003 | Chiang et al. | |
| 2003/0104282 A1 | 6/2003 | Xing et al. | |
| 2003/0198869 A1 | 10/2003 | West et al. | |

FOREIGN PATENT DOCUMENTS

| | | |
|---|---|---|
| EP | 0 922 049 B1 | 2/1998 |
| EP | 0 932 215 A1 | 1/1999 |
| EP | 0 796 511 B1 | 8/1999 |
| EP | 1 024 502 A1 | 8/2000 |
| EP | 0 932 215 B1 | 5/2001 |
| EP | 1 202 374 A1 | 5/2002 |
| JP | 57-034662 | 2/1982 |
| JP | 57-080670 | 5/1982 |
| JP | 57-111957 | 7/1982 |
| JP | 57-176669 A2 | 10/1982 |
| JP | 59-224072 A2 | 12/1984 |
| JP | 60-195877 | 10/1985 |
| JP | 60-216461 | 10/1985 |
| JP | 61-288374 | 12/1986 |
| JP | 62-209169 A2 | 9/1987 |
| JP | 63-010466 | 1/1988 |
| JP | 63-310569 | 12/1988 |
| JP | 02-080462 | 3/1990 |
| JP | 02-262274 | 10/1990 |
| JP | 02-291603 | 12/1990 |
| JP | 03-139566 | 6/1991 |
| JP | 60-052893 A2 | 7/1992 |
| JP | 05-036441 | 2/1993 |
| JP | 05-290616 | 11/1993 |
| JP | 08-078053 A2 | 3/1996 |
| JP | 09-306544 | 11/1997 |
| JP | 11-214032 A2 | 1/1998 |
| JP | 10-172615 A2 | 6/1998 |
| JP | 11-185804 | 7/1999 |
| JP | 11-238523 | 8/1999 |
| JP | 11-302383 | 11/1999 |
| JP | 11-302384 A2 | 11/1999 |
| JP | 11-306856 A2 | 11/1999 |
| JP | 11-306857 A2 | 11/1999 |
| JP | 2000-058123 | 2/2000 |
| JP | 2000-154254 A2 | 6/2000 |
| JP | 2000-222939 A2 | 8/2000 |
| JP | 2000-277152 A2 | 10/2000 |
| JP | 2001-068115 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-063936 A2 | 2/2002 |
| JP | 2002-151150 A2 | 5/2002 |
| JP | 2002 155142 A2 | 5/2002 |
| JP | 2002-298913 A2 | 10/2002 |
| JP | 2002-343440 A2 | 11/2002 |
| JP | 2003-002174 A2 | 1/2003 |
| WO | WO 96/21953 | 7/1996 |
| WO | WO 98/07729 A1 | 2/1998 |
| WO | WO 00/00495 A1 | 1/2000 |
| WO | WO 00/08654 | 2/2000 |
| WO | WO 00/25323 A1 | 5/2000 |
| WO | WO 01/73884 A1 | 10/2001 |
| WO | WO 01/96446 A1 | 12/2001 |
| WO | WO 01/99209 A2 | 12/2001 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

D. Fenton et al., Complexes of Alkali Metal Ions with Poly(Ethylene Oxide), Polymer, Nov. 1973, 589, 14.

S. Kohama et al., Alcoholysis of Poly(methylhydrogensiloxane), Journal of Applied Polymer Science, 1977, 21, 863-867.

E. Tsuchida et al., Conduction of Lithium Ions in Polyvinylidene Fluoride and its Derivates-I, Electrochimica Acta, 1983, 591-595, 28(5).

L. Hardy et al., Chloride Ion Conductivity in a Plasticized Quaternary Ammonium Polymer, Macromolecules, 1984, 975-977, 17.

P. Blonsky et al., Polyphosphazene Solid Electrolytes, Journal of American Chemical Society, 1984, 6854-6855, 106.

D. Bannister et al., A Water-Soluble Siloxane: Poly(ethylene glycol) Comb Polymer, Journal of Polymer Science: Polymer Letters Edition, 1985, 465-467, 23.

I. Kelly et al., Poly(Ethylene Oxide) Electrolytes for Operation at Near Room Temperature, Journal of Power Sources, 1985, 13-21, 14.

D. Fish et al., Conductivity of Solid Complexes of Lithium Perchlorate with Poly{[w-methoxyhexa(oxyethylene)ethoxy]methylsiloxane}[a)], Makromol. Chem., Rapid Commun., 1986, 115-120, 7.

P. Hall et al. Ion Conductivity in Polysiloxane Comb Polymers With Ethylene Glycol Teeth, Polymer Communications, 1986, 3 pages, 27.

D.R. MacFarlane et al., Synthesis and Aqueous Solution Phase Behavior of Siloxane-Poly (Alkylene Glycol) Comb Copolymers, Department of Chemistry, Monash University, Clayton, Victoria, Australia, *Polymer Preprints,* 1987, 28, 405-406.

D. Fish et al., Polymer Electrolyte Complexes of ClO$_4$ and Comb Polymers of Siloxane with Oligo-oxyethylene Side Chains, British Polymer Journal, 1988, 281-288, 20, 3.

S. Ganapathiappan et al., A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules, 1988, 2684-2689, 21.

R. Spindler et al., Investigations of a Siloxane-Based Polymer Electrolyte Employing $^{13}$C, $^{29}$Si, $^{7}$Li, and $^{23}$Na Solid State NMR Spectroscopy, Journal of American Chemical Society, 1988, 3036-3046, 110.

R. Spindler et al., Synthesis NMR Characterization, and Electrical Properties of Siloxane-Based Polymer Electrolytes, Macromolecules, 1988, 648-654, 21.

S. Ganapathiappan et al., Synthesis, Characterization and Electrical Response of Phosphazene Polyelectrolytes, Journal of America Chemical Society, 1989, 4091-4095, 111.

M. Ouchi et al., Convenient and Efficient Tosylation of Oligoethylene Glycois and the Related Alcohols in Tetrahydrofuran-Water in the Presence of Sodium Hydroxide, The Chemical Society of Japan, 1990, 1260-1262, 63, 4.

L. Dominey et al., Thermally Stable Lithium Salts for Polymer Electrolytes, Electrochimica Acta, 1992, 1551-1554, 37(9).

F. Alloin et al., Triblock Copolymers and Networks Incorporating Oligo (Oxyethylene) Chains, Solid State Ionics, 1993, 3-9, 60.

C. St. Pierre et al., Lithium-Metal-Polymer Battery for Electric Vehicle and Hybrid Electric Vehicle Applications, www.avestor.com/en/automotive.html, info@avestor.com, 1993, 11 pages.

G. Zhou et al., Solvent-Free Cation-Conduction Polysiloxane Electrolytes with Pendant Oligo(oxyethylene) and Sulfonate Groups, Macromolecules, 1993, 2202-2208, 26.

M. Gauthier et al., Large Lithium Polymer Battery Development The Immobile Solvent Concept, Journal of Power Sources, 1995, 163-169, 54.

H. Allcock et al., Polyphosphazenes Bearing Branched and Linear Oligoethyleneoxy Side Groups as Solid Solvents for Ionic Conduction, Macromolecules, 1996, 7544-7552, 29.

K. Abraham et al., Highly Conductive PEO-Like Polymer Electrolytes, Journal of Chemical Materials, 1997, 1978-1988, 9(9).

M. Furlani et al., Time Resolved Luminescence and Vibrational Spectroscopic Studies on Complexes of Poly(Ethylene Oxide) Oligomers and Eu(TFSI)$_3$ Salt, 11$^{th}$ International Conference on Solid State Ionics, 1997, 10 pages.

J. Gnanaraj et al., Studies on Comb-like Polymer Blend with Poly(Ethylene Oxide)—Lithium Perchlorate Salt Complex Electrolyte, Polymer, 1997, 3709-3712, 38(14).

F. Gray, Polymer Electrolytes, RSC Materials Monographs, UK, 1997, 46-49.

C. Letourneau et al. Progress in Lithium-Metal-Polymer Battery System for Electric Vehicles, http://www.avestor.com/iactivefiles/evs15.pdf, info@avestor.com, INTELEC, Oct. 1998, Canada, 1-10.

J. Blackwell et al., B(C$_6$F$_5$)$_3$-Catalyzed Silation of Alcohols: A Mild, General Method for Synthesis for Silyl Ethers, Journal of Organic Chemistry, 1999, 4887-4892, 64.

R. Hooper et al., A Highly Conductive Solid-State Polymer Electrolyte Based on a Double-Comb Polysiloxane Polymer with Oligo(Ethylene Oxide) Side Chains, Organometallics, American Chemical Society, 1999, 3249-3251, 18(17).

Z. Wang et al., Thermal, Electrochemical, and Spectroscopic Characterizations of Hyperbranched Polymer Electrolyte, Journal of Electrochemical Society, 1999, 2209-2215, 146(6).

M. Anderman et al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol)$_n$ Dimethacrylates—Thermal, Mechanical and Electrochemical Properties in Relationship to the Network Structure, Polymer, 2000, 3821-3836, 41.

R. Hooper et al., Highly Conductive Siloxane Polymers, Macromolecules, 2001, 931-936, 34.

X. Hou et al., Novel Interpenetrating Polymer Network Electrolytes, Polymer, 2001, 4181-4188, 42.

C.F. Rome The Unique Properties of Silicone at the Service of the Petroleum Industry, Hydrocarbon Asia, 2001, 42-49, 'www.hcasia.safan.com/mag/may-jun01/Tech-Silicone.pdf'.

W. Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).

W. Xu et al., Ionic Conductivity and Electrochemical Properties of Lithium Orthoborate Salts, http://www.electrochem.org/meetings/past/200/abstracts/symposia/bla/0107.pdf, United States, Sep. 5, 2001.

N. Katayama et al., Thermal Stability of Propylene Carbonate and Ethylene Carbonate-Propylene Carbonate-Based Electrolytes for Use in Li Cells, Journal of Power Sources, 2002, 1-6, 4769, http://www.sciencedirect.com/web-editions.

K. Xu et al., LiBOB as Salt for Lithium-Ion Batteries, Electrochemical and Solid State Letters, 2002, pp. A26-A29, vol. 5(1).

J. Alper, The Battery: Not Yet a Terminal Case, Science, May 2002, 1224-1226, vol. 296, www.sciencemag.org.

Y. Kang et al., Solid Polymer Electrolytes based on Cross-linked Siloxane-g-oligoethylene oxide: Ionic conductivity and Electrochemical Properties, Abstract book of 11th International Meeting on Lithium Batteries (IMLB 11), Jun. 23-28, 2002.

B. Oh et al., New Interpenetrating Electrolyte Network-Type Siloxane Polymer Electrolyte, Electrochemical and Solid State Letters, 2002, E59-E61, 5(11), The Electrochemical Society, Inc., Sep. 11, 2002.

T. Fuji et al. Application of LiBOB as an Electrolyte Salt for 4 V Class Lithium Ion Rechargeable Cells, whttp://www2.electrochem.org/cgi-bin/abs?mtg=202&abs=0203, Oct. 24, 2002, United States.

W. Xu et al., Structures of Orthoborate Anions and Physical Properties of Their Lithium Salt Nonaqueous Solutions, Journal of the Electrochemical Society, 2003, 1-0, 150(1).

International Search Report, dated May 1, 2003, received in relation to Application No. PCT/US03/02127.

Y. Kang et al., Solid Polymer Electrolytes Based on Cross-Linked Polysiloxane-g-oligo(ethylene oxide): Ionic Conductivity and Electrochemical Properties, *Journal of Power Sources* 119-121 (Jun. 1, 2003), pp. 448-453.

International Search Report, dated Jul. 11, 2003, received in relation to Application No. PCT/US03/02128.

International Search Report, dated Jul. 11, 2003, received in relation to Application No. PCT/US03/08740.

International Search Report, dated Sep. 12, 2003, received in relation to Application No. PCT/US03/08784.

International Search Report, dated Oct. 9, 2003, received in relation to Application No. PCT/US03/08779.

International Search Report, dated Oct. 9, 2003, received in relation to Application No. PCT/US03/08783.

Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.

Nicodom Ltd., Inorganic Library of FT-IR Spectra Inorganics II—Boron Compounds, homepage, website http://www.ftir.cz/INLIB2.html and http://www.ftir.cz/home_page_of_nicodom_sro.htm.

* cited by examiner

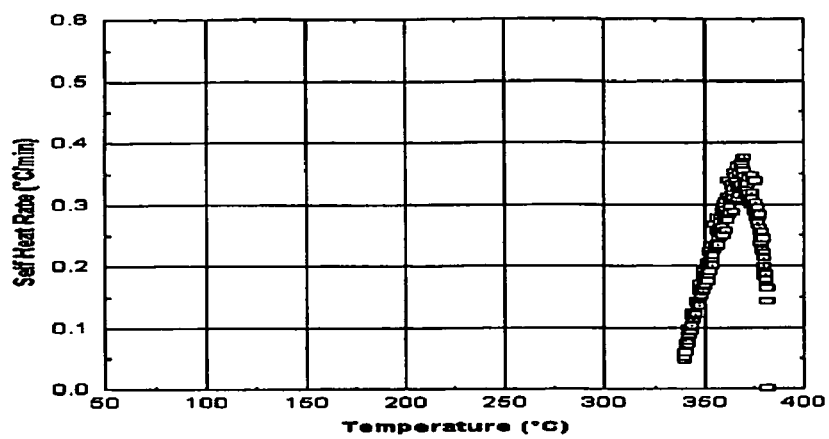
Figure7a (Comparison 1)
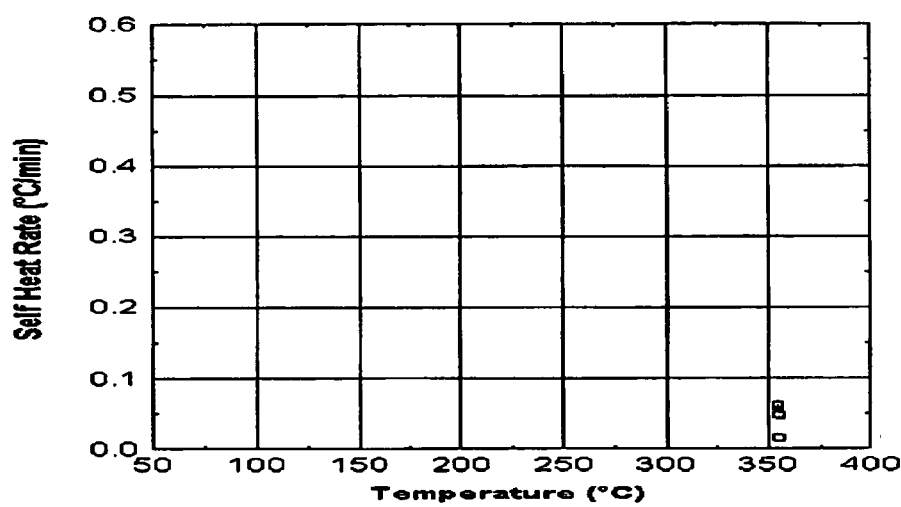
Figure 7b (Comparison 2)
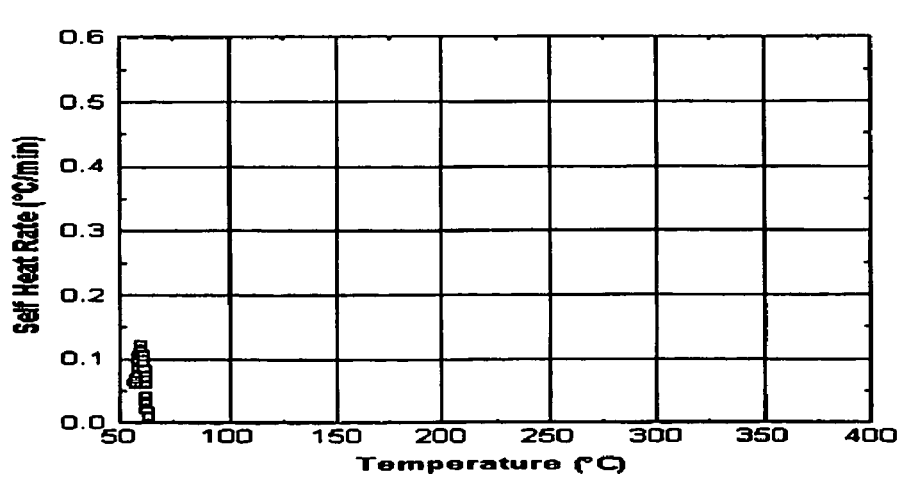
Figure 7c (Example 4)

SOLID POLYMER ELECTROLYTE AND METHOD OF PREPARATION

CONTRACTUAL ORIGIN OF THE INVENTION

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory.

CROSS REFERENCE TO RELATED APPLICATIONS

This application is national stage of PCT application Ser. No. PCT/US03/02128, which claims priority to U.S. application Ser. No. 10/104,352, the disclosure of each of which is incorporated herein by reference.

FIELD

The present invention relates to the composition and assembly methods of solid polymer electrolytes and their use in electrochemical cells, especially in lithium ion rechargeable batteries. The invention particularly relates to interpenetrating network type solid polymer electrolyte systems with highly ionic conductivity poly(ethylene oxide) ("PEO") grafted siloxane polymers as a conducting phase.

BACKGROUND

Efforts to develop electrochemical cells having PEO based solid electrolyte systems have continued since about 1973. (M. B. Armand, Fast Ion Transport in Solids, North Holland, Amsterdam, p665, (1973); D. E. Fenton et al., Polymer, 14, 589 (1973)). The main advantages of such a cell system are multifold: (1) very high energy density; (2) potential for excellent electrolyte stability; (3) the ability to be configured in nearly any shape since it contains no liquid; (4) the opportunity to be very inexpensive; (5) inherent safety characteristics; and (6) an expansive market if successfully developed. Up to now the key impediment to the successful development of such a polymer cell for room temperature operation is the low ionic conductivity of the solid polymer electrolyte. A major effort to develop the solid polymer electrolyte ("SPE") system is being carried out by Hydro Quebec and 3M under contract to the United States Advanced Battery Consortium (USABC) for electric vehicle applications. The batteries developed in this effort are operated at approximately 60° C. to 80° C. (140° F. to 176° F.), and achieve about 800 cycles (M. Gauthier et al., J. Power Sources, 54, 163 (1995)). All attempts in this program to successfully develop a room temperature SPE based battery were unsuccessful because of the low ionic conductivity at room temperature of PEO based electrolyte using the lithium trifluoromethane sulfonyl imide [LiN(CF3SO3), LiTFSI] salt ("TFSI"). Based on examination and evaluation of the various solid electrolytes developed to date (L. A. Dominey et al., Electrochim. Acta, 37, 1551 (1992); F. Alloin et al., Solid State Ionics, 60, 3 (1993)), it is quite apparent that PEO based polymer or derivative thereof appears to be the most promising.

One type of PEO investigated thoroughly is the high molecular weight (about 4 million) linear variety, which forms relatively strong, free-standing films at room temperature. Its strength is derived from a semicrystalline microstructure. Lithium ion transport in such materials depends on the complexation of lithium ions by the oxygen atoms in oxyethylene units in the polymer chains. High molecular weight PEO doped with the lithium salt $LiN(SO_2CF_3)_2$, LiTFSI, has an optimum conductivity of $10^{-5}$ S/cm at 80° C. (176° F.) (S. Kohama et al., J. Appl. Polym. Sci., 21, 863 (1977)). Many lithium salt complexes of PEO at room temperature are predominantly crystalline until a melting point of 68° C. (154.5° F.) leading to very poor ionic conductivities of approximately $10^{-7}$ S/cm. The improved conductivities using the TFSI salt are due to the plasticizing effect of the anion which substantially reduces the crystallinity of the PEO complex at room temperature. It is important to note that only the amorphous PEO electrolyte is ionically conductive.

Substantial research effort has been devoted to lowering the operating temperature of SPE to the ambient region. To solve this problem, alkyl phthalates and poly(ethylene glycol) dialkyl ether with low molecular weight have been used as plasticizing additives for SPE to reduce the crystalline region and increase the mobility of the SPE molecular chain at ambient temperature. Low molecular poly(ethylene oxide-dialkyl ether compounds) can contribute to increased room temperature ionic conductivity of SPE, but they still have a crystallization problem which decreases the ionic conductivity at certain temperatures. Another approach to attempt to improve the ionic conductivity at ambient temperature was to synthesize a highly branched PEO to decrease the crystalline tendency of PEO main chain and to increase the chain mobility regarding lithium ion transport such as hyper-branched SPE (Z. Wang et al., J. Electrochem. Soc., 146(6), 2209 (1999)), and comb-like SPEs (J. S. Gnanaraj, R. N. Karekar et al., Polymer, 38(14) 3709 (1997)). However, the ionic conductivity of such highly branched PEO is still low at ambient temperature. All of these efforts were intended to create amorphous polymer near ambient temperature.

To apply a SPE to a real practical electrochemical cell system, adequate mechanical strength is required. Simple crystalline PEO may meet that requirement, but most of modified PEO based SPEs are not strong enough for real cell applications. Crosslinked SPEs were developed as a solution, but the crosslinking reaction restricts polymer chain mobility that is needed for lithium ion transport. (U.S. Pat. No. 4,908,283 to Takahashi, U.S. Pat. No. 4,830,939 to Lee, U.S. Pat. No. 5,037,712 to Shackle and U.S. Pat. No. 3,734,876 to Chu). More advanced systems are the interpenetrating network ("IPN") type SPE that consist of crosslinked polymers and an ionic conducting phase which is mostly low molecular weight PEO base compounds. The ionic conductivity of such systems, however, still depends on the flexibility of poly(alkylene oxide) which has a temperature dependency on its mobility, as well as on its mechanical strength which is not obvious. Most prior patents have disclosed the use of volatile solvents to dissolve the PEO compounds and metal salts. The use of volatile solvents to make the SPEs increase the processing steps such as evaporation and recovery, increase costs of manufacture, and may pose serious environmental and safety issues. U.S. Pat. No. 5,112,512 to Nakamura discloses crosslinking PEO crosslinking agent to siloxane with a PEO side chain which has a reactive unsaturated bond. This crosslinking approach results in a significantly reduced flexibility of siloxane with PEO polymer. The present invention is distinguished in that the siloxane is captured inside the network with no chemical bonds to the PEO crosslinking agent, greatly enhancing flexibility.

Accordingly, the present inventors have developed a new type of IPN polymer electrolyte having PEO grafted onto polysiloxanes as an ion conducting phase and a porous support to overcome the above-mentioned problems such as low room temperature ionic conductivity, chemical and electrochemical stability, as well as safety. The PEO grafted polysiloxanes are liquid compounds, electrochemically stable and have low glass transition temperature with little or no crystallization problems. Notably the present invention does not include any volatile solvent in the polymer electrolyte preparation.

OBJECTIVES

A primary objective of the present invention is to provide an IPN SPE having increased room temperature ionic conductivity with chemical and electrochemical stability.

Another object of the invention is to provide a thin IPN SPE with reduced bulk impedance and excellent mechanical strength.

An additional object of the present invention is to provide an improved method to manufacture an electrochemical battery having an IPN solid polymer.

To fulfill the above objectives, the IPN SPE in the present invention is fabricated by using the composition which comprises branched type siloxane polymer in a liquid state, crosslinking agent selected from diacrylate terminated poly(alkylene oxide) compounds, crosslinking density controlling compounds selected from poly(alkylene oxide) acrylate alkyl ether compounds, a lithium salt and a thermal initiator.

A further object of the invention is to provide a fabrication method to prepare the IPN type SPEs through thermal crosslinking. This method uses a porous media such as polyolefin separator, nonwoven fabrics, polycarbonate membrane, etc. to reduce the bulk impedance of SPE through minimizing its thickness.

SUMMARY

The present invention relates to a SPE and its preparation method. More particularly, the present invention relates to an IPN type SPE having PEO grafted siloxane polymer as the major ionic conducting phase which has excellent ionic conductivity and mechanical strength, and its preparative method is quite simple. The SPEs resulting from the present invention are suitable electrolytes for lithium polymer secondary batteries.

BRIEF DESCRIPTION OF THE DRAWINGS

FIGS. 7a, 7b and 7c are graphs showing the measured heat flow from decomposition reaction of test samples.

DETAILED DESCRIPTION

Figure 1:
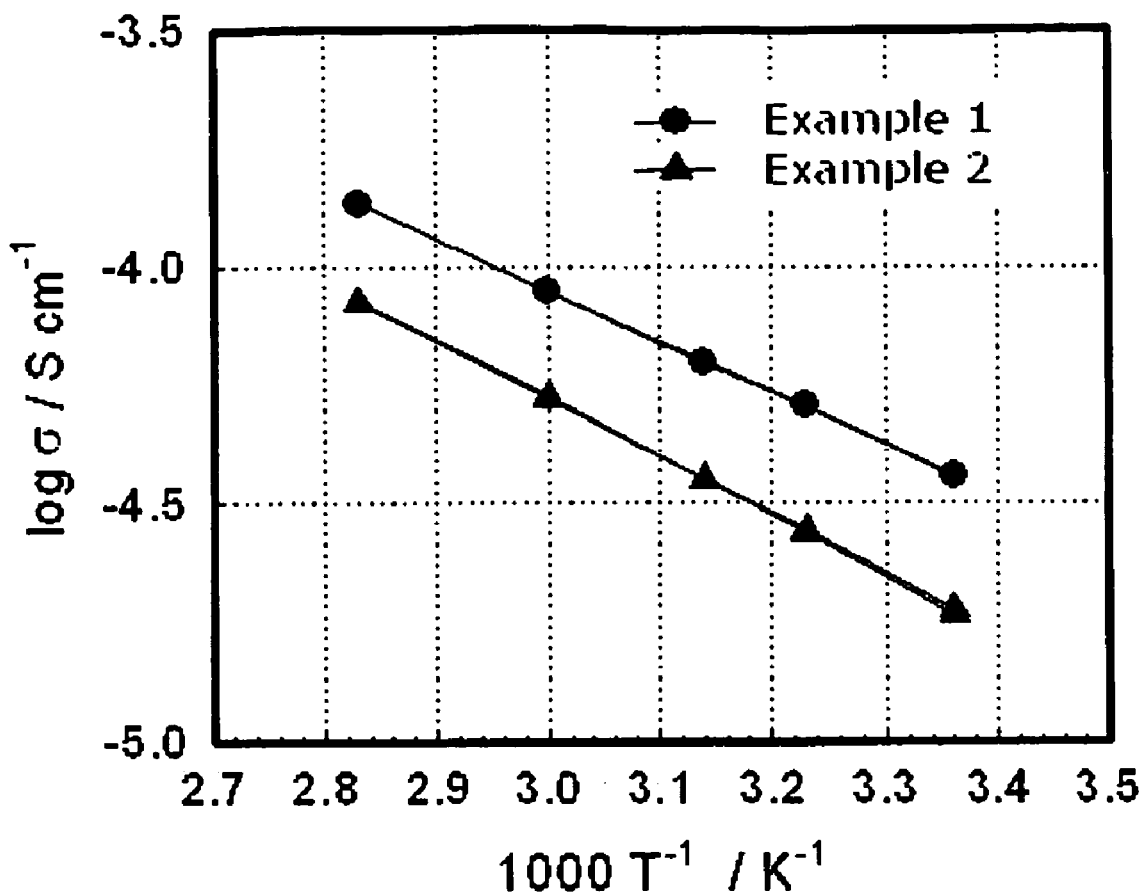
FIG. 1 is a temperature vs. ionic conductivity graph for the present invention.

The SPE of the present invention comprises an IPN of two separate continuous phases that are compatible with each other. One of the phases is a crosslinked polymer that ensures its mechanical strength and chemical stability, and the other is a conducting phase for dissociating ion. The crosslinking phase can also assist metal salt dissolution and transportation.

The elaborately designed highly branched siloxane polymer of the present invention has one or more PEO groups as a side chain. The PEO group is directly grafted to silicon atoms in the siloxane polymer. This kind of branched type siloxane polymer is stably anchored in the network structure and provides continuous conducting paths in all directions throughout the IPN SPE.

The branched type siloxane polymer easily dissolves the lithium salt and has the required flexibility to transport the lithium ions. Through the fabrication method suggested by this invention, the polysiloxane is well anchored in the IPN polymer electrolyte and increases the polymer ionic conductivity by its high segmental mobility.

The present invention includes all types of siloxane polymers with PEO as a side chain and the branched type siloxane polymers represented by the formula (I-a and I-b) are specific examples of the present invention:

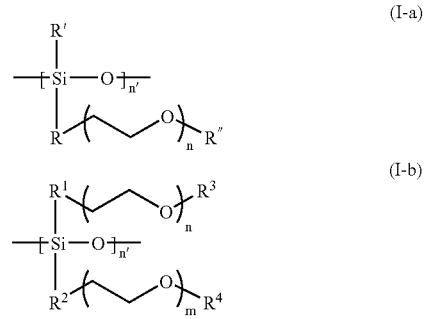

Wherein each of R, R1 and R2 represents oxygen or a group selected from an alkylene oxide group having 1 to 6 carbon atoms; each of R', R", R3 and R4 represents hydrogen or a group selected from an alkyl group having 1 to 12 carbon atoms and/or an alkenyl group having 2 to 8 carbon atoms; each of n and m represents whole numbers from 1 to 12; and n' represents whole numbers from 4 to 10,000.

The crosslinking agent in the present invention is represented by formula (II):

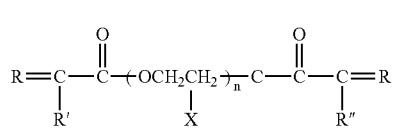

(II)

Wherein R represents a group selected from an alkylidene group having 1 to 10 carbon atoms; and each of R' and R" represents hydrogen or a group selected from an alkyl group having 1 to 10 carbon atoms and/or an alkenyl group having 2 to 12 carbon atoms; and X being hydrogen or a methyl group; and n represents a numeral of 1 to 15.

The monomer used for the control of crosslinking density of the IPN SPE is represented by formula (III):

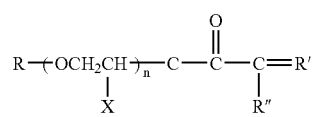

(III)

Wherein R and represents an alkylidene group having 1 to 10 carbon atoms; R' represents an alkyl group having 1 to 10 carbon atoms; R" represents hydrogen or a group selected from an alkyl group having 1 to 10 carbon atoms and/or an alkenyl group having 2 to 12 carbon atoms; X is hydrogen or a methyl group; and n represents a numeral of 1 to 20.

The lithium salt to be used in the present invention is not particularly limited, as long as it dissolves in the polymer and serves as an electrolyte for a lithium secondary battery. Examples of specific lithium salts include $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, lithium bis (oxalato) borate (LiBOB), and a mixture thereof, as well as salts yet to be identified.

The molar ratio of the lithium salt to the oxygen in the organic mixture of branched type siloxane polymer, crosslinking agent and monofunctional compound is preferably 0.01 to 0.2. If the proportion of the lithium salt is smaller than 0.01, the ionic conductivity of the resulting IPN SPE is significantly decreased because of an inadequate number of carrier ions are in the SPE. If the molar ratio is greater than 0.2, the lithium salt is not sufficiently dissociated in the resulting IPN SPE and the aggregation of lithium ion can reduce the ionic conductivity.

FIG. 1 shows the effect of temperature on the ionic conductivity of two IPN polymer electrolytes. Example 1 is with 60 wt % branched type siloxane polymer (n=7.2 in formula I-a), 30 wt % poly(ethylene glycol) ethyl ether methacrylate, 10 wt % of poly(ethylene glycol-600) dimethacrylate and $Li(CF_3SO_2)_2N$. Example 2 is with 50 wt % branched type siloxane polymer (n=7.2, R' and R" are methyl groups in formula I-a), 40 wt % poly(ethylene glycol) ethyl ether methacrylate, 10 wt % of poly(ethylene glycol-600) dimethacrylate and $Li(CF_3SO_2)_2N$. Both of the two IPN SPEs show high ionic conductivity over $10^{-5}$ S/cm at room temperature. The anchored siloxane, without any chemical bonding with the IPN structure, gives improved ionic conductivity to the IPN type crosslinked SPE. More important is the content of liquid siloxane in the IPN SPE; as the more content of branched type siloxane polymer is increased, so is the ionic conductivity.

Figure 2:
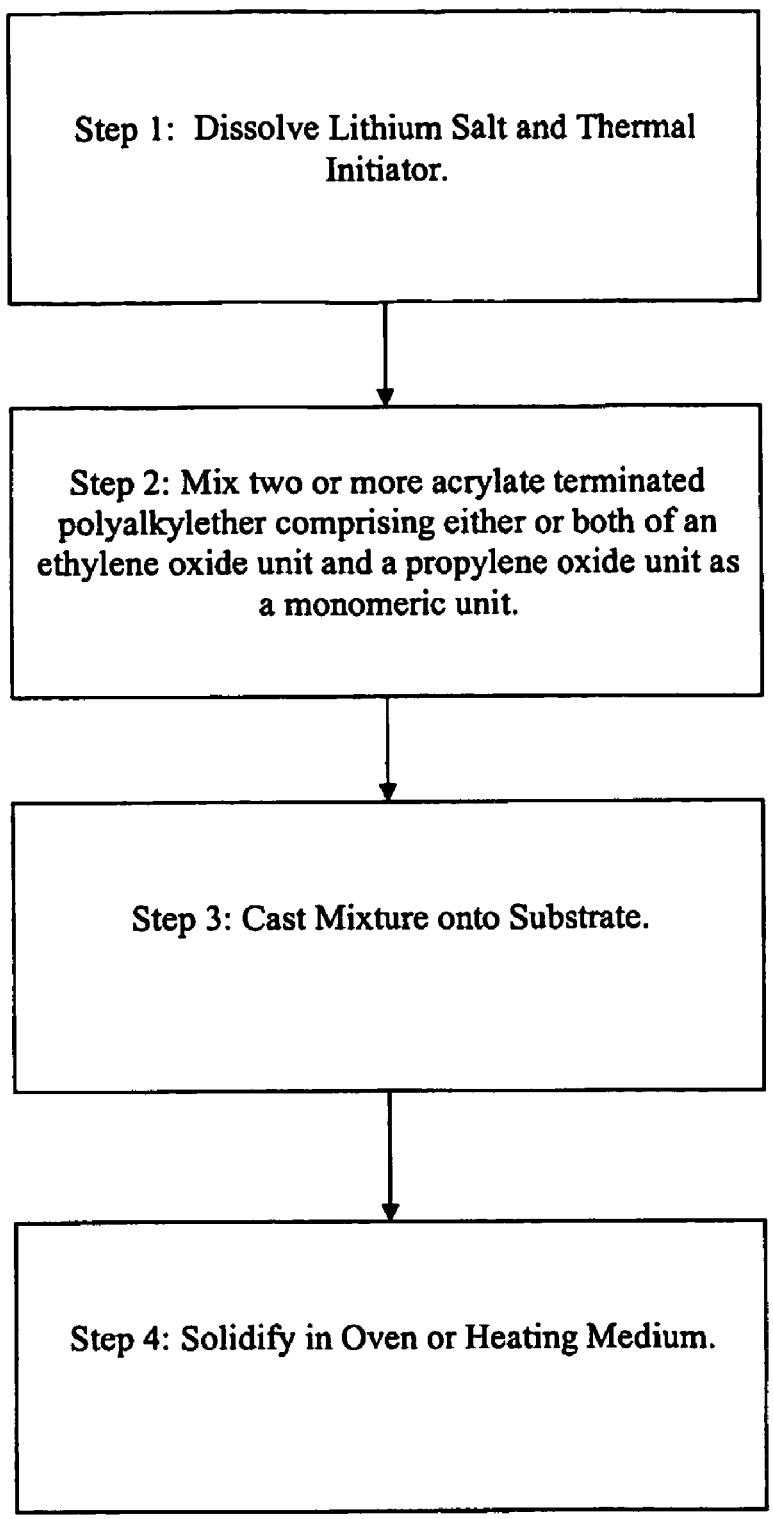
FIG. 2 is a flow chart illustrating the steps of a method for implementing the present invention.

FIG. 2 delineates the requisite steps in a method for preparing an interpenetrating network type polymer electrolyte, comprising the steps of: (1) dissolving a lithium salt and a thermal initiator selected from azo compounds such as azoisobutyronitrile, peroxide compounds such as benzoylperoxide and bismaleimide in a branched type siloxane based polymer (formula I-a or I-b); (2) mixing two or more acrylate terminated polyalkylether comprising either or both of an ethylene oxide unit and a propylene oxide unit as a monomeric unit in the resulting solution; (3) casting the resulting mixture called a precursor solution onto a substrate, porous medium such as polyolefin separator, nonwoven and polycarbonate membrane or a surface of the electrode; and (4) placing the cast film in an oven or on a heating medium for solidification thereof.

The porous media of the present invention will be used to reduce the thickness of IPN SPE and are preferably polyolefin separator, nonwovens and polycarbonate microporous membrane. The final thickness of SPE of the present invention with the porous supporter is below 100 μm, preferably below 50 μm.

Figure 3:
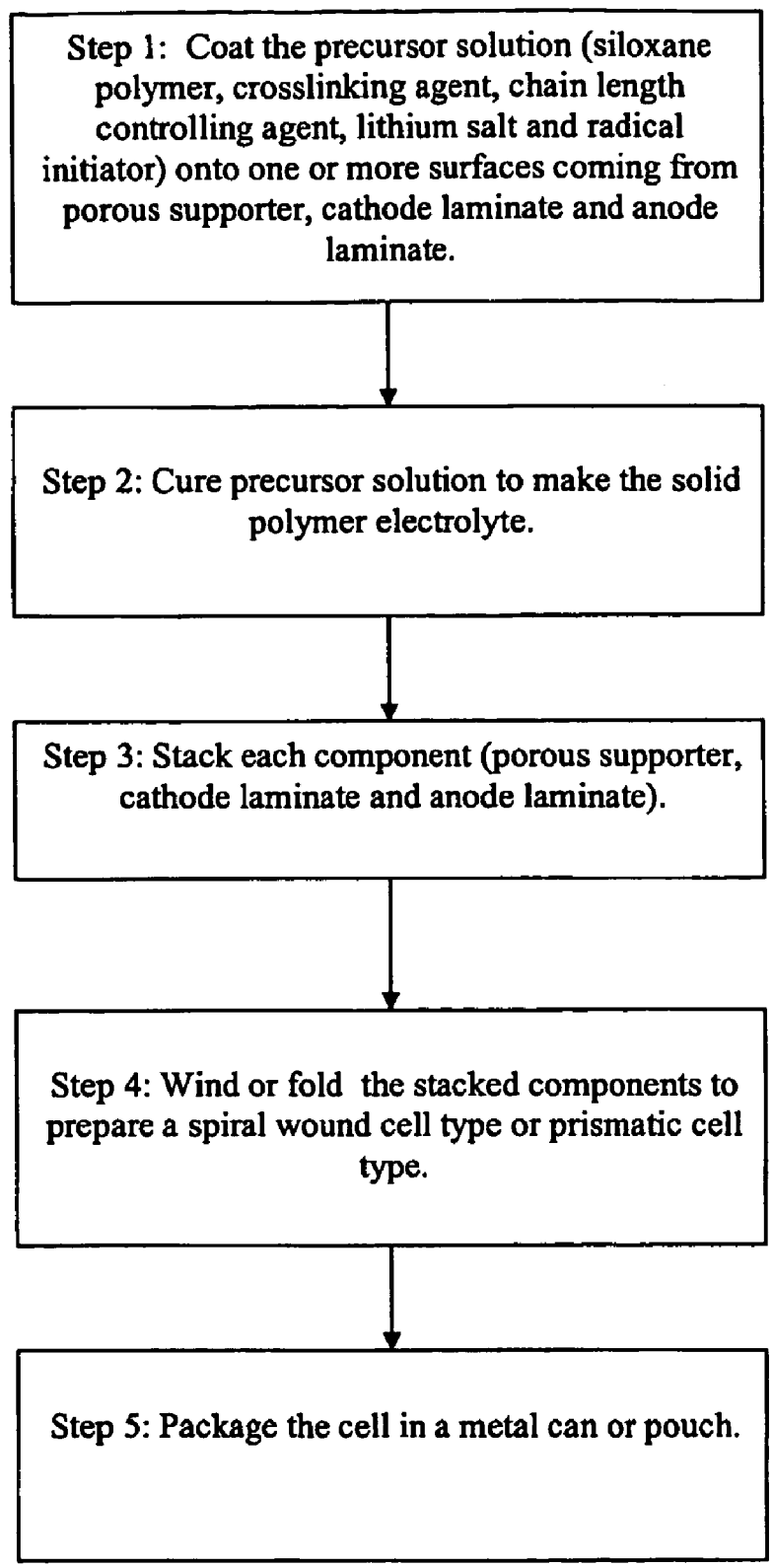
FIG. 3 is a flow chart illustrating the steps of another method for implementing the present invention.

FIG. 3 delineates the method for assembling a lithium rechargeable cell with the SPE of the present invention, comprises the steps of: (1) coating the precursor solution including siloxane polymer, crosslinking agent, chain length controlling agent, lithium salt and radical initiator onto one or more surfaces coming from porous supporter, cathode laminate and anode laminate; (2) curing the precursor solution to make the SPE; (3) stacking each components including porous supporter, cathode laminate and anode laminate properly; (4) winding or folding the stacked components to prepare the spiral wound cell type or prismatic cell type; and (5) packaging the cell in a metal can, plastic pouch or laminated plastic/metal foil pouch. Such stacking, winding and packaging are well known in the art.

Figure 4:
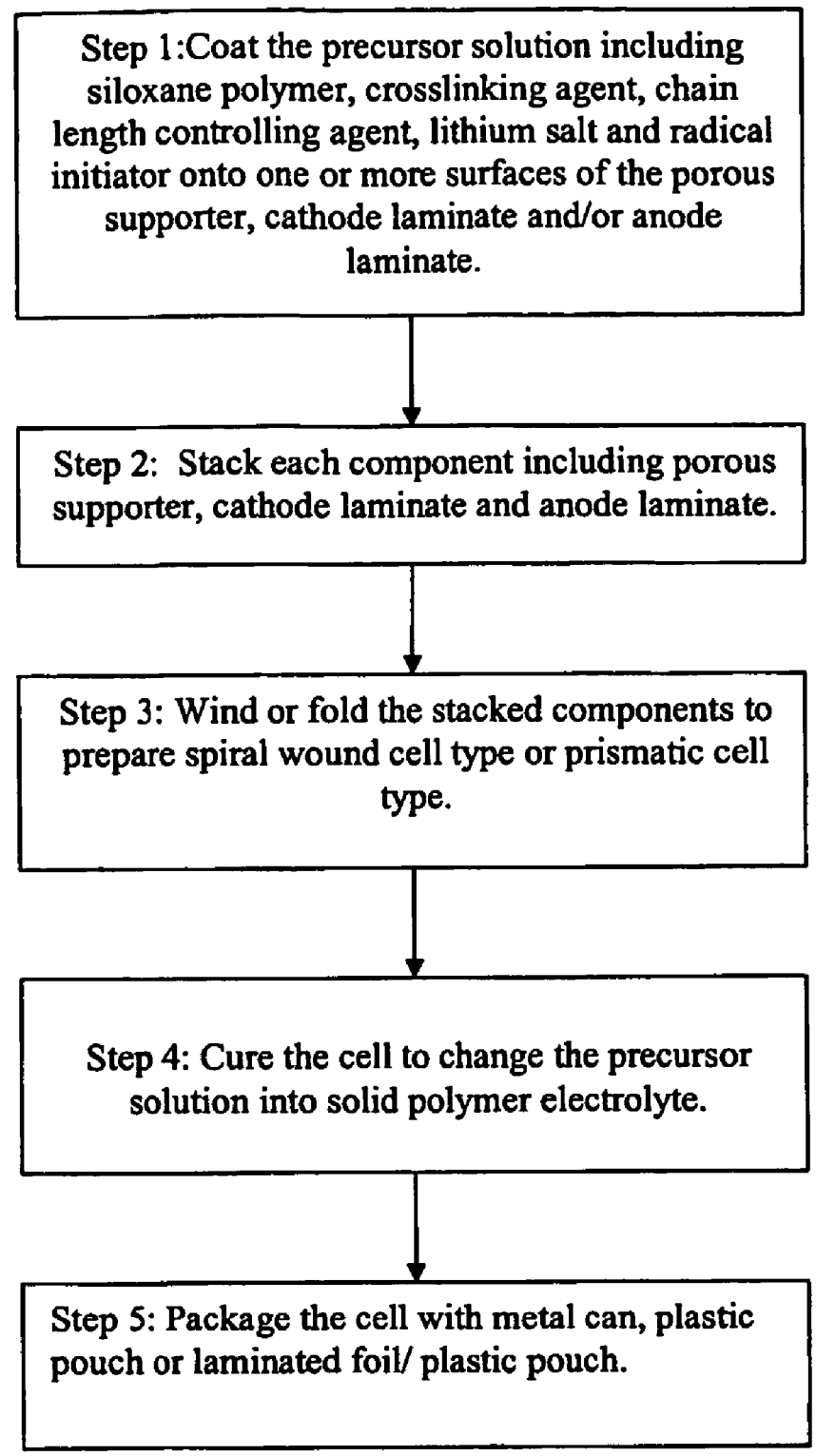
FIG. 4 is a flow chart illustrating the steps of another method for implementing the present invention.

FIG. 4 denotes another method for assembling lithium rechargeable cell with the SPE of the present invention, comprises the steps of: (1) coating the precursor solution including siloxane polymer, crosslinking agent, chain length controlling agent, lithium salt and radical initiator onto one or more surfaces coming from porous supporter, cathode laminate and anode laminate; (2) stacking each component, including porous supporter, cathode laminate and anode laminate properly; (3) winding or folding the stacked components to prepare spiral wound cell type or prismatic cell type; (4) curing the cell to change the precursor solution into SPE; and (5) packaging the cell with metal can, plastic pouch or laminated foil/plastic pouch.

Figure 5:
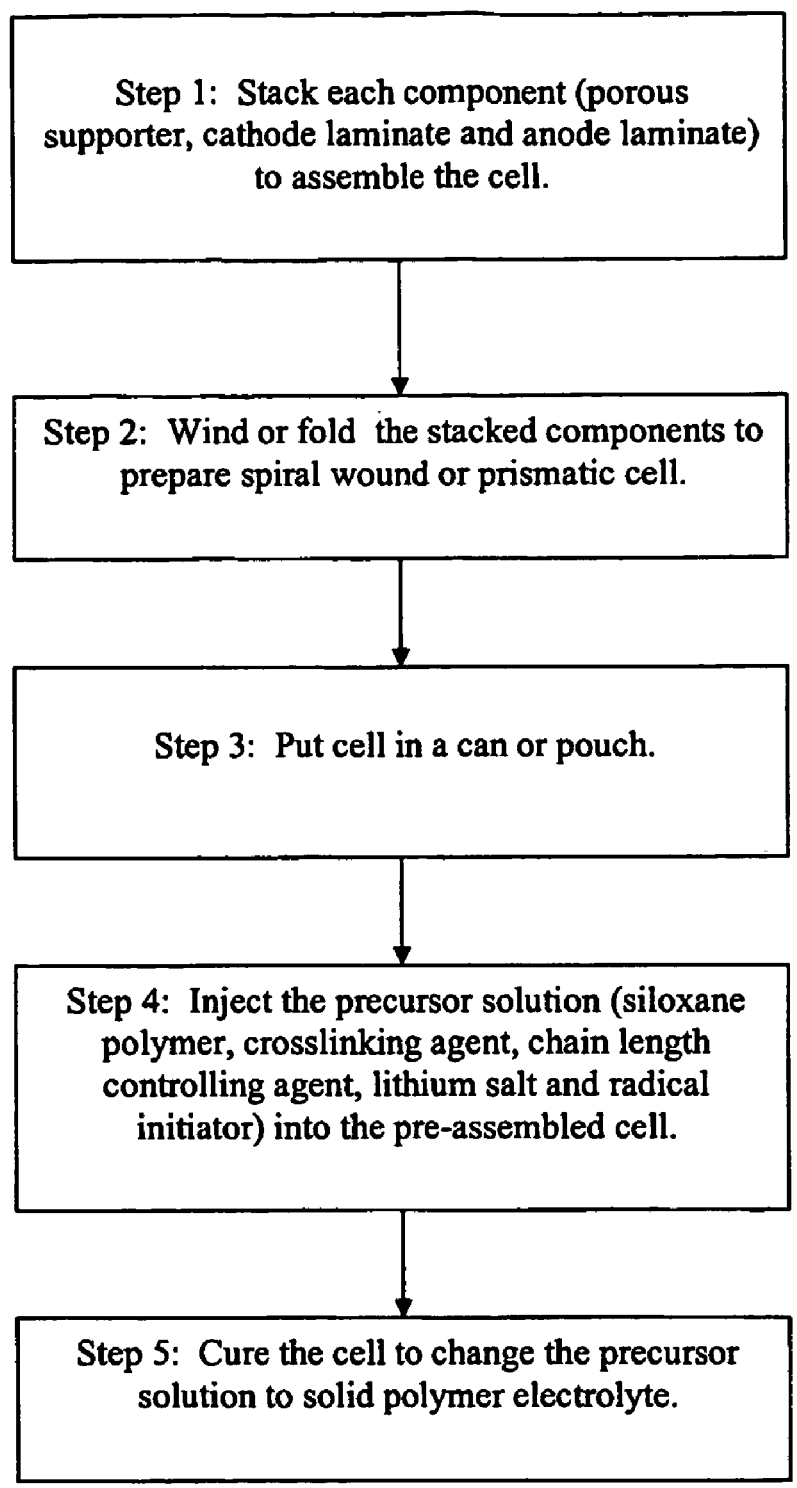
FIG. 5 is a flow chart illustrating the steps of another method for implementing the present invention.

FIG. 5 denotes the steps of another method for assembling the lithium rechargeable cell with the SPE of the present invention, comprises the steps of: (1) stacking each component including porous supporter, cathode laminate and anode laminate properly to assemble the cell; (2) winding or folding the stacked components to prepare spiral wound cell type or prismatic cell type; (3) putting the cell in a metal can, plastic pouch or laminated metal foil/plastic pouch; (4) injecting the precursor solution including siloxane polymer, crosslinking agent, chain length controlling agent, lithium salt and radical initiator into the pre-assembled cell; and (5) curing the cell to change the precursor solution to SPE.

The present invention will be better understood by reference to the following examples which are intended for purposes of illustration and are not intended to nor are to be interpreted in any way as limiting the scope of the present invention, which is defined in the claims appended hereto.

EXAMPLES 1–2

For Examples 1–2, Li(CF$_3$SO$_2$)$_2$N (LiTFSI) salt was dissolved in a branched type siloxane polymer (n=7.2, R' and R" are methyl groups in formula I-a, Mn=ca. 2000), poly(ethylene glycol) ethyl ether methacrylate (PEGEEMA) with average Mn of ca. 246 and poly(ethylene glycol-600) dimethacrylate (PEGDMA600) with average Mn of ca. 740 mixture. After clear dissolution of LiTFSI, benzoyl peroxide was added into the resulting solution and mixed to get a precursor solution for IPN type SPE. The composition of Examples 1–2 is shown in Table 1. Porous polycarbonate membrane is used as a supporter for the IPN SPEs. The ionic conductivity of the IPN polymer electrolytes at temperatures ranging from 25 to 80° C. were measured from the ac impedance curves of 2030 button cells assembled by sandwiching the IPN SPE between two stainless steel discs with a frequency range from 1 MHz to 10 Hz. The result is shown in FIG. 1. Both of two IPN SPEs show high ionic conductivity over $10^{-5}$ S/cm at room temperature and as the content of branched type siloxane polymer is increased, so is the ionic conductivity.

TABLE 1

| Example # | Composition [grams] | | | | |
|---|---|---|---|---|---|
| | Branched siloxane polymer | PEGDMA600 | PEGEEMA | LiTFSI | BPO |
| 1 | 2.400 | 0.400 | 1.200 | 0.770 | 0.016 |
| 2 | 2.000 | 0.400 | 1.600 | 0.800 | 0.020 |

EXAMPLE 3

Figure 6:
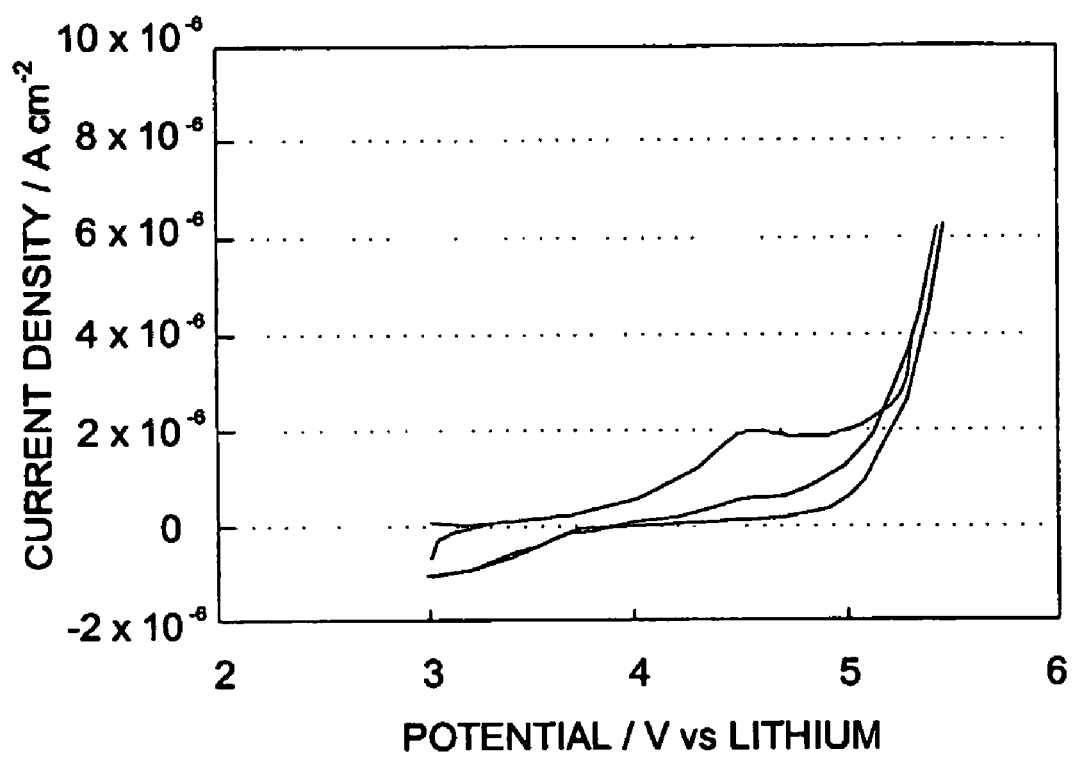
FIG. 6 is a graph showing the cyclic voltammogram of electrochemical stability.

FIG. 6 is a trace of current density vs. potential during repeated voltage sweep of a cell made according to this invention at a scan rate of 5 mV/sec. It shows the electrochemical stability with 60 wt % branched type siloxane polymer (n=7.2, R' and R" are methyl groups in formula I-a infra), 30 wt % poly(ethylene glycol) ethyl ether methacrylate, 10 wt % of poly(ethylene glycol-600) dimethacrylate and Li(CF$_3$SO$_2$)$_2$N. More specifically, it shows the electrochemical stability of IPN SPE with the same composition as Example 1. Polypropylene melt-blown type nonwoven separator material is used as a supporter for this IPN SPE. The electrochemical stability window of this IPN polymer electrolyte was determined by cyclic voltammetry with a 2030 button cell assembled by sandwiching this IPN SPE between a stainless steel disc as a working electrode and lithium metal disc as the counter and reference electrodes. This IPN SPE shows an excellent electrochemical stability window of over 4.5 V and only a minimal decomposition peak around 4.5 V during the first anodic sweep. Notably, except for a slight variation during the first cycle, each subsequent cycle shows almost identical current density versus potential. This level of electrochemical stability during repeated cycling is extraordinary.

COMPARISONS 1 AND 2, AND EXAMPLE 4

Accelerating rate calorimetry (ARC) was used to investigate the chemical and thermal degradation of branched type siloxane polymer and its IPN polymer electrolyte at elevated temperatures of up to 400° C. The ARC is an adiabatic calorimeter in which heat evolved from the test sample is used to raise the sample temperature. The ARC is conducted by placing a sample in a sample bomb inside an insulating jacket. In an ARC analysis, the sample is heated to a preselected initial temperature and held a period of time to achieve thermal equilibrium. A search is then conducted to measure the rate of heat gain (self-heating) of the sample. If the rate of self-heating is less than a preset rate after the programmed time interval (typically 0.02° C./min), the sample temperature is stepped to a new value, and the heat-wait-search sequence is repeated. Once a self-heating rate greater than the present value is measured, the heat-wait-search sequence is abandoned; the only heating supplied to the calorimeter thereafter is that required to maintain the adiabatic condition between the sample and the jacket. Heat generated from the reaction inside the sample increases its temperature and pressure, thereby increasing the rate of the reaction. Sample weight for the test was 500 mg. Each sample was introduced in a 2¼"×¼" diameter stainless steel bomb as a sample for ARC test. The detail compositions are explained in Table 2.

TABLE 2

| Sample | Branched siloxane polymer | PEGDMA600 | LiTFSI |
|---|---|---|---|
| | | | [grams] |
| Comparison 1 | 0.5000 | — | — |
| Comparison 2 | 2.0000 | — | 0.3205 |
| Example 4 | 2.0000 | 1.3333 | 0.3495 |

FIGS. 7a-c show the heat flow from decomposition reaction of the samples. FIG. 7a (Comparison 1) shows its rapid reaction due to thermal decomposition and carbonization around 350° C. (662° F.). FIG. 7b (Comparison 2) shows better thermal behavior caused by the coordination bonds between oxygen atoms and the lithium salt, which has a thermal stability of over 350° C. (662° F.), but there was still decomposition reaction around 360–370° C. (648° F.–698° F.). FIG. 7c (Example 4) shows only the heat of reaction due to thermal crosslinking to make an IPN structure at 60° C. (140° F.) and then no significant decomposition reaction was detected up to 400° C. (752° F.). It was thus found that the IPN structure significantly enhances the thermal stability of its SPE.

EXAMPLE 7

Lithium Ion Transference Number

Figure 8A:
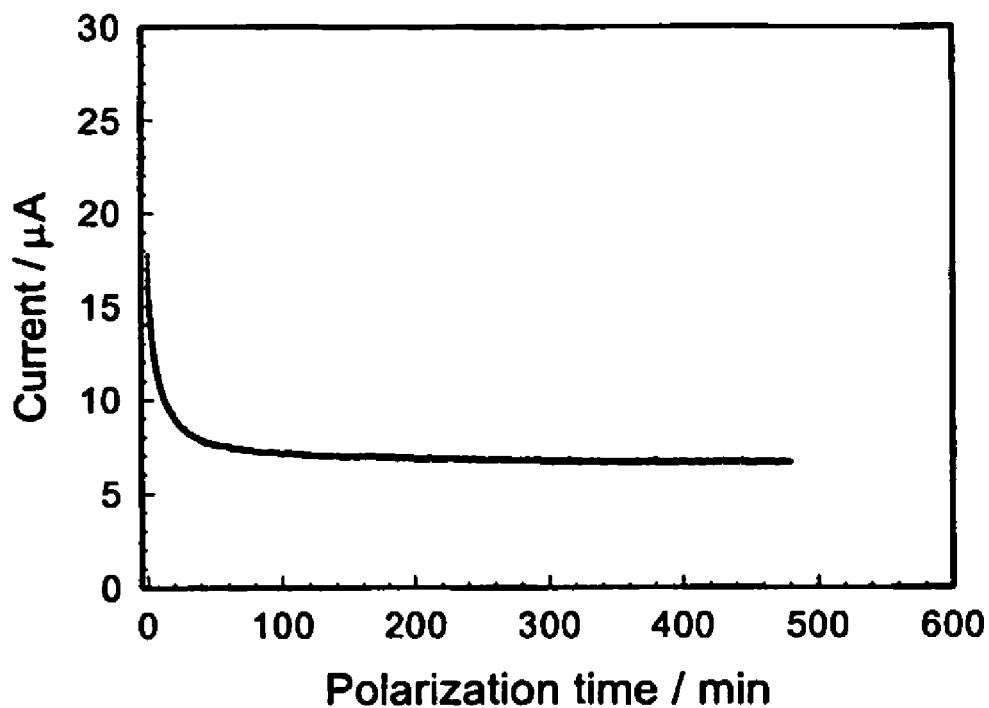
FIGS. 8a and 8b show a potentiostatic curve (FIG. 8a) and impedance spectra (FIG. 8b) of lithium metal/IPN SPE of Example 2/lithium metal cell to measure lithium transference number of the SPE.
Figure 8B:
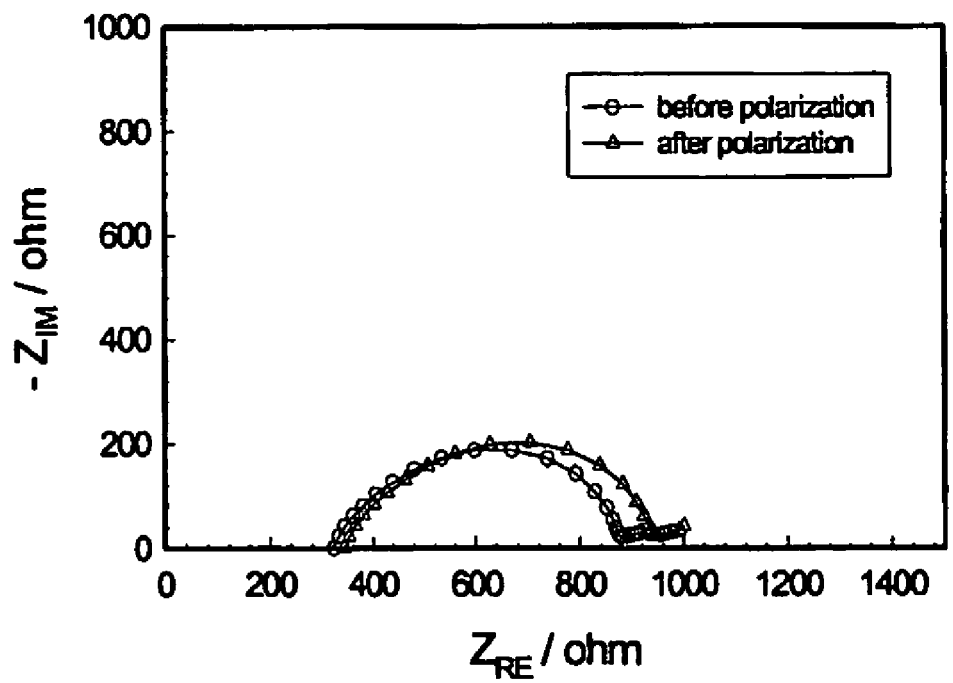

Li metal/IPN SPE of Example 2/Li metal cell was assembled for the measurement of Li ion transference number t+. A 2030 button cell was used. A potentiostatic curve (FIG. 8a) was measured by using dc polarization method and the change of the cell impedance before and after polarization (FIG. 8b) was examined by using Schlumberger model 1255 frequency response analyzer connected to Schlumberger model 1286 electrochemical interface and EG&G PAR 273 potentiostat. The Li transference number was given by following equation suggested by K. M. Abraham et al., Chem. Mater., 9, 1978 (1997):

$$t_+ = \frac{I_s R_b^s (V - I_o R_i^o)}{I_o R_b^o (V - I_s R_i^s)}$$

Wherein V is the dc potential applied across the symmetric cell, o and s represent the initial and steady state, and b and i represent bulk and interfacial resistance of the electrolyte.

Lithium transference number of IPN SPE of Example 2 was approximately 0.29, which is much improved over that of pure PEO SPE, which is about 0.015.

EXAMPLE 8

Cell Test

IPN SPE was prepared using the same composition as in Example 1 with a nonwoven support material. A 2030 button cell was assembled with lithium metal as an anode, IPN SPE of Example 8 and $LiNi_{0.8}Co_{0.2}O_2$ as a cathode. The preparation method for assembling the 2030 button cell with the SPE of Example 8, comprised the steps of: coating the precursor solution of Example 8 onto cathode laminate; stacking IPN SPE and lithium metal; putting a plate spring and top lid on the stacked components to 2030 button cell and crimping; curing the cell to change the precursor solution to SPE at 70° C. for 1 hr.

The composition of the cathode is listed in Table 3. The effective cell area was 1.6 cm$^2$. Charge and discharge rate were C/6. There was no degradation peak caused by the metal oxide up to 4.1 V and the specific discharge capacity was over 130 mAh/g.

TABLE 3

| Electrode | Composition [wt %] | | | |
|---|---|---|---|---|
| | $LiNi_{0.8}Co_{0.2}O_2$ | PVdF* | Graphite | Carbon black |
| Cathode | 84 | 8 | 4 | 4 |

*poly(vinylidene fluoride)

Figure 9A:
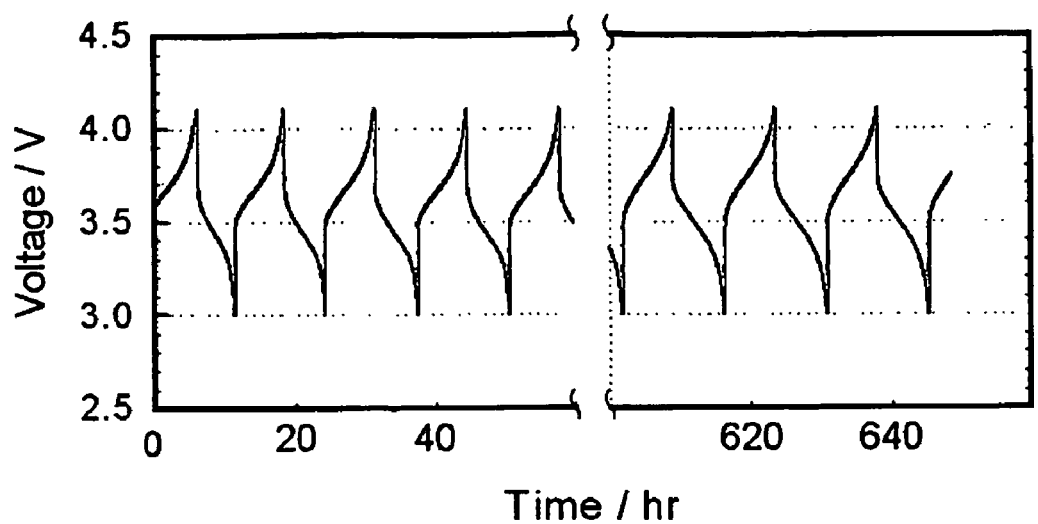
FIGS. 9a and 9b show a charge/discharge pattern (FIG. 9a) and specific discharge capacity (FIG. 9b) according to cycle number of lithium metal/IPN SPE of Example 8/LiNi$_{0.8}$Co$_{0.2}$O$_2$ cathode cell.
Figure 9B:
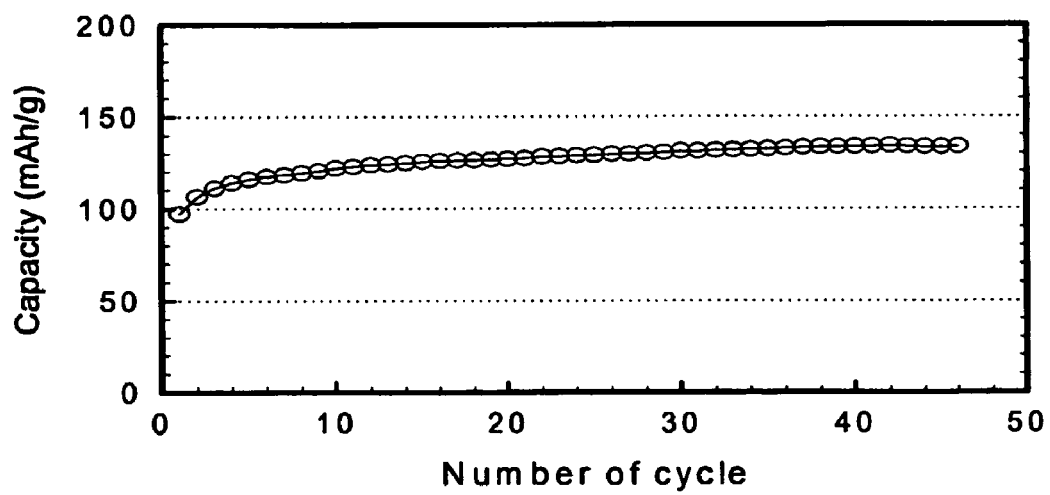

The remarkable electrochemical stability of the present invention is illustrated by FIGS. 9a and 9b. It can be seen in FIG. 9a that after 48 cycles (charges and discharges) there was no decrease in capacity at all. Although the cathode material, $LiNi_{0.8}Co_{0.2}O_2$, is a strong oxidizing material, the IPN SPE of this invention does not show any degradation problem up to 4.1 V. FIG. 9b shows that the capacity of the test cell made according to the present invention increased in capacity from 100 mAh/g to about 130 mAh/g over the first approximately 40 cycles, then remained stable at that level.

Figure 10A:
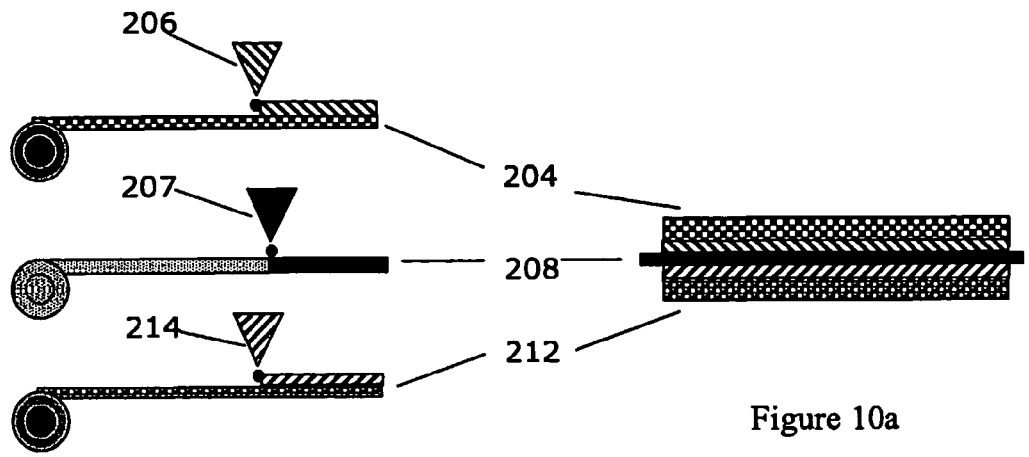
FIG. 10a is an illustration of the method of fabricating a cell according to the present invention.
Figure 10B:
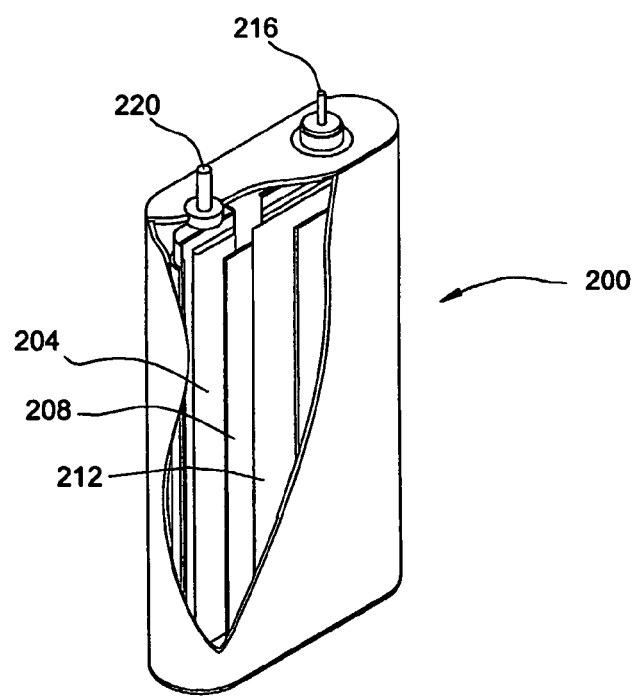
FIG. 10b is a cut-away drawing of an electrochemical cell incorporating a SPE.

FIGS. 10a and 10b illustrate the construction of an electrochemical cell 200 incorporating the SPE of the best mode of the present invention. This prismatic "wound" type cell ("jelly roll") comprises (1) a cast positive electrode material 204 made of metal oxide active material, PVDF binder and carbon additive with the precursor solution made of the mixture of comb siloxane polymer, poly(ethylene glycol) ethyl ether methacrylate, poly(ethylene glycol) dimethacrylate and lithium salt $Li(CF_3SO_2)_2N$ 206, (2) porous polycarbonate film 208 cast with the precursor solution of comb siloxane polymer, poly(ethylene glycol) ethyl ether methacrylate, poly(ethylene glycol) dimethacrylate and lithium salt $Li(CF_3SO_2)_2N$ 207, and (3) a cast porous negative electrode 212 made of carbon and PVDF binder with the precursor solution made of the mixture of comb siloxane polymer, poly(ethylene glycol) ethyl ether methacrylate, poly(ethylene glycol) dimethacrylate and lithium salt $Li(CF_3SO_2)_2N$ 214. The positive and negative electrodes 204 and 212 are electrically coupled to terminals 216 and 220.

This invention is equally applicable to related technologies including super capacitors and hybrid devices incorporating aspects of capacitors and batteries. For the purposes of this patent, "electrochemical cell" shall refer to all forms of electrochemical storage devices, including single cells, batteries, capacitors, super capacitors and hybrid electrochemical devices.

BEST MODE OF THE PRESENT INVENTION

The inventors believe the best mode for the IPN polymer electrolyte is with the composition of 10 wt % to 80 wt %, more preferably about 30 wt % to 75 wt %, even more preferably about 50 wt % to 70 wt %, comb type siloxane polymer (n=7.2 in formula I-a), 30 wt % poly(ethylene glycol) ethyl ether methacrylate, 10 wt % of poly(ethylene glycol) dimethacrylate with molecular weight of 600 and $Li(CF_3SO_2)_2N$ supported by porous polycarbonate membrane. This composition and construction shows the highest ionic conductivity of $3.6 \times 10^{-5}$ S/cm at 25° C. and $5.1 \times 10^{-5}$ S/cm at 37° C. The crosslinking agent should constitute between 5% and 60%, more preferably between 10% and 40%, by weight of all organic compounds in the SPE. The monomeric compound for controlling crosslinking density should constitute about 15% to 40% by weight of the total weight of organic compounds in the SPE. The thickness of porous polycarbonate membrane should be approximately 20 μm and the total thickness of the IPN polymer electrolyte should be about 95 μm. The radical reaction initiator should be a thermal initiator such as benzoyl peroxide and azoisobutyronitrile.

The inventors further believe the best method of assembly is as follows:

Step 1. Cast the porous polycarbonate film with a liquid solution made of the mixture of comb siloxane polymer, poly(ethylene glycol) ethyl ether methacrylate, poly(ethylene glycol) dimethacrylate, lithium salt $Li(CF_3SO_2)_2N$, and a radical initiator.

Step 2. Cast the porous positive electrode made of oxide active material, PVDF binder and carbon additive with the liquid solution made of the mixture of comb siloxane polymer, poly(ethylene glycol) ethyl ether methacrylate, poly(ethylene glycol) dimethacrylate, lithium salt $Li(CF_3SO_2)_2N$, and a radical initiator.

Step 3. Cast the porous negative electrode made of carbon and PVDF binder with the liquid solution made of the mixture of comb siloxane polymer, poly(ethylene glycol) ethyl ether methacrylate, poly(ethylene glycol) dimethacrylate, lithium salt $Li(CF_3SO_2N$, and a radical initiator.

Step 4. Wind the cast porous polycarbon film with the cast positive and negative electrode in prismatic wound configuration.

Step 5. Put the jelly roll in a flexible packaging and seal.

Step 6. Cure the cell at 80° C. for 1 h.

Step 7. Seal the cell packaging.

Having described the present invention, it should be apparent to the reader that many variations of the present invention are possible without departure from the scope of the present invention. The specific implementations disclosed above are by way of example and for the purposes of enabling persons skilled in the art to implement the invention only. Accordingly, the invention is not to be limited except by the appended claims and legal equivalents.

The invention claimed is:

1. An electrochemical device, comprising:
an electrolyte including
at least siloxane polymer including side chains linked to a backbone, at least one silicon in the backbone is linked to one of the side chains as represented in formula I-a

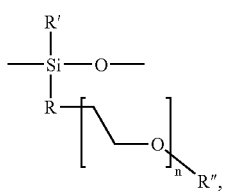

(I-a)

where;
R is an oxygen;
R' is selected from the group consisting of: hydrogen, an alkyl group having 1 to 12 carbon atoms, and an alkenyl group having 2 to 8 carbon atoms;
R" is selected from the group consisting of hydrogen, an alkyl group having 1 to 12 carbon atoms, and alkenyl group having 2 to 8 carbon atoms; and
each n is a whole umber from 1 to 12;
a second polymer forming an interpenetrating polymer network with the at least one siloxane polymer; and
at least one metal salt.

2. The electrochemical device of claim 1, wherein at least one siloxane polymer is non-covalently bonded to the second polymer.

3. The electrochemical device of claim 1, wherein the at least one siloxane polymer is not cross-linked.

4. The electrochemical device of claim 1, wherein the second polymer is cross-linked.

5. The electrochemical device of claim 1, wherein the second polymer has at least one side chain including a poly(alkylene oxide) moiety.

6. The electrochemical device of claim 1, wherein the electrolyte is a solid.

7. The electrochemical device of claim 1, wherein the second polymer is selected so as to be fabricated from a monomer represented by formula (II),

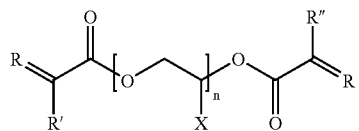

(II)

where
R is an alkylidene group having 1 to 10 carbon atoms;
each of R' and R" is selected from the group consisting of: hydrogen, an alkyl group having 1 to 10 carbon atoms, and an alkenyl group having 2 to 12 carbon atoms;
X is hydrogen or a methyl group; and
n is a whole number from 1 to 15.

8. The electrochemical device of claim 1, wherein the siloxane polymer is represented by formula I-a

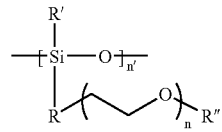

(I-a)

where R is an oxygen;
each of R' and R" is selected from the group consisting of: hydrogen, an alkyl group having 1 to 12 carbon atoms, and an alkenyl group having 2 to 8 carbon atoms;
n is a whole number from 1 to 12; and
n' is a whole number from 4 to 10,000.

9. The electrochemical device of claim 1, wherein the proportion of the siloxane polymer is 10 to 80 weight percent of the total weight of the polymer in the electrolyte.

10. The electrochemical device of claim 1, wherein the proportion of the siloxane polymer is 50 to 70 weight percent of the total weight of the polymer in the electrolyte.

11. The electrochemical device of claim 1, wherein the second polymer is 5 to 60 weight percent of the total weight of the polymer in the electrolyte.

12. The electrochemical device of claim 1, wherein the second polymer is 10 to 40 weight percent of the total weight of the polymer in the electrolyte.

13. The electrochemical device of claim 1, wherein the electrolyte is incorporated into a porous medium.

14. The electrochemical device of claim 13, wherein the porous medium includes one or more components selected from the group consisting of: a polyolefin separator, a polyolefin nonwoven type separator, and a polycarbonate microporous membrane.

15. The electrochemical device of claim 1, wherein the electrolyte further comprises:
at least one monofunctional monomeric compound for controlling cross-linking density, and
at least one initiator.

16. The electrochemical device claim 15, wherein the monomeric unit for controlling cross-linking density is represented by formula (III),

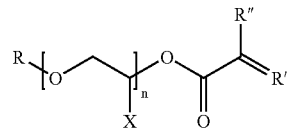

(III)

where
R is an alkyl group having 1 to 10 carbon atoms;
R' is an alkylidene group having 1 to 10 carbon atoms;
R" is selected from the group consisting of: hydrogen, an alkyl group having 1 to 10 carbon atoms, and an alkenyl group having 2 to 12 carbon atoms;
X is hydrogen or a methyl group; and
n is a whole number from 1 to 20.

17. The electrochemical device claim 15 wherein the monomeric compound is 10 to 50 weight percent of the total weight of the polymer in the electrolyte.

18. The electrochemical device of claim 1, wherein at least one metal salt is a lithium salt.

19. The electrochemical device of claim 18, wherein the lithium salt includes one or more components selected from the group consisting of LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiBOB, LiN(SO$_2$C$_2$F$_5$)$_2$, and lithium alkyl fluorophosphates.

20. The electrochemical device of claim 18, wherein the lithium salt includes LiBOB.

21. The electrochemical device of claim 18, wherein a molar ratio of the lithium salt relative to the molar concentration of oxygen in the solid polymer electrolyte is in a range of 0.01 to 0.2.

22. The electrochemical device of claim 15, wherein the initiator is a thermal initiator.

23. The electrochemical device of claim 15, wherein the initiator includes one or more components selected from a group consisting: of azo compounds, peroxide compounds, and bismaleimide.

24. The electrochemical device of claim 15, wherein the initiator includes azoisobutyronitrile.

25. The electrochemical device of claim 15, wherein the initiator includes benzoylperoxide.

26. The electrochemical device of claim 15, wherein the second polymer includes a polyalkyldiacrylate.

27. The electrochemical device of claim 15, wherein the second polymer includes a polyalkyldimethacrylate.

28. The electrochemical device of claim 15, wherein the second polymer is one of a plurality of second polymers.

29. A method of forming an electrochemical device, comprising:
obtaining an electrolyte including
at least one siloxane polymer including side chains linked to a backbone, at least one silicon in the backbone is linked to one of the side chains as represented in formula I-a

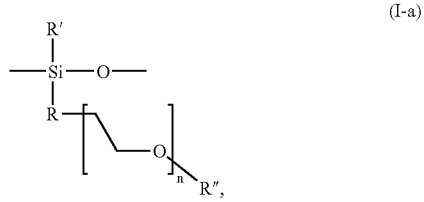

where;
R is an oxygen;
R' is selected from the group consisting of: hydrogen, an alkyl group having 1 to 12 carbon atoms, and an alkenyl group having 2 to 8 carbon atoms;
R" is selected from the group consisting of hydrogen, an alkyl group having 1 to 12 carbon atoms, and alkenyl group having 2 to 8 carbon atoms; and
each n is a whole umber from 1 to 12;
a second polymer forming an interpenetrating polymer network with the at least one siloxane polymer; and
at least one metal salt; and
activating an anode and a cathode with the electrolyte.

30. The method of claim 29, wherein obtaining the electrolyte includes mixing at least one siloxane polymer with a second polymer precursor such that the second polymer precursor forms a second polymer that forms an interpenetrating polymer network with the at least one siloxane polymer.

31. The method of claim 30, wherein mixing at least one siloxane polymer with a second polymer precursor includes mixing at least one compound for terminating polymerization of the second polymer, at least one metal salt, and at least one initiator.

32. The method of claim 29, wherein the interpenetrating network is formed such that at least one siloxane polymer is not covalently bonded to the second polymer.

33. The method of claim 29, wherein the interpenetrating network is formed such that at least one siloxane polymer is not cross-linked.

34. The method of claim 29, wherein the interpenetrating network is formed such that the second polymer is cross-linked.

35. The method of claim 29, wherein obtaining the electrolyte includes forming a second polymer having one or more sides chains that include a poly(alkylene oxide)moiety.

36. The method of claim 29, wherein the electrolyte is a solid.

37. The method of claim 29, wherein obtaining the electrolyte includes forming the second polymer from a monomer represented by formula (II),

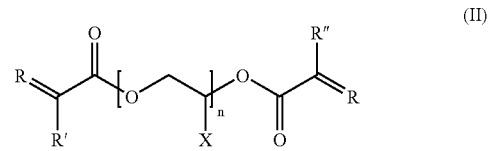

where R is an alkylidene group having 1 to 10 carbon atoms;
each of R' and R" is selected from the group consisting of: hydrogen, an alkyl group having 1 to 10 carbon atoms, and an alkenyl group having 2 to 12 carbon atoms;
X is hydrogen or a methyl group; and
n is a whole number from 1 to 15.

38. The method of claim 29, wherein at least siloxane polymer is represented by formula I-a

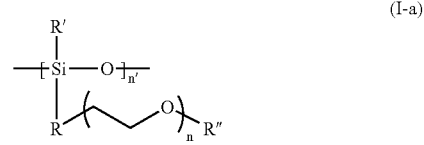

where R is an oxygen;
each of R' and R" is selected from the group consisting of: hydrogen, an alkyl group having 1 to 12 carbon atoms, and an alkenyl group having 2 to 8 carbon atoms;
n is a whole number from 1 to 12; and
n' is a whole number from 4 to 10,000.

39. The method of claim 29, wherein the proportion of the siloxane polymer is 10 to 80 percent by weight of the total weight of the solid polymer electrolyte.

40. The method of claim 29, wherein the proportion of the siloxane polymer is 50 to 70 percent by weight of the total weight of the solid polymer electrolyte.

41. The method of claim 29, wherein the second polymer is 10 to 40 percent by weight of the total weight of solid polymer electrolyte.

42. The method of claim 29, further comprising: incorporating the electrolyte into a porous medium before activating the anode and the cathode.

43. The method of claim 42, wherein the porous medium includes one or more components selected from the group consisting of: a polyolefin separator, a polyolefin nonwoven type separator, and a polycarbonate microporous membrane.

44. The method of claim 29, wherein obtaining the electrolyte includes forming a polyalkyldiacrylate to serve as the second polymer.

45. The method of claim 29, wherein obtaining the electrolyte includes forming a polyalkyldimethacrylate to serve as the second polymer.

46. The method of claim 29, wherein at least one metal salt is a lithium salt.

47. The method of claim 46, wherein the lithium salt includes one or more components selected from the group consisting of $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, LiBOB, and lithium alkyl fluorophosphates.

48. The method of claim 46, wherein the lithium salt includes LiBOB.

49. The device of claim 8, wherein the second polymer is selected so as to be fabricated from a monomer represented by formula (II),

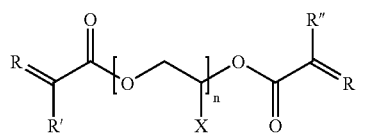
(II)

where R is an alkylidene group having 1 to 10 carbon atoms;

each of R' and R'' is selected from the group consisting of: hydrogen, an alkyl group having 1 to 10 carbon atoms, and an alkenyl group having 2 to 12 carbon atoms;

X is hydrogen or a methyl group; and n is a whole number from 1 to 15.

50. The device claim 49, wherein the second polymer is selected so as to be fabricated from the monomer represented by formula (II) and a co-monomer represented by formula (III),

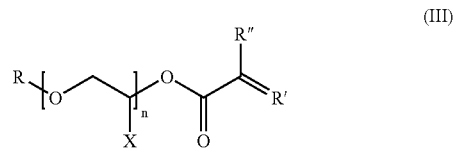
(III)

where R is an alkyl group having 1 to 10 carbon atoms;

R' is an alkylidene group having 1 to 10 carbon atoms;

R'' is selected from the group consisting of hydrogen, an alkyl group having 1 to 10 carbon atoms, and an alkenyl group having 2 to 12 carbon atoms, X is hydrogen or a methyl group; and n is a whole number from 1 to 20.

* * * * *